United States Patent [19]

Overdulve et al.

[11] 4,169,216
[45] Sep. 25, 1979

[54] ELECTRONIC HOLD AND HOLD-RELEASE CIRCUIT FOR A TELEPHONE SET IN A MULTIPLE EXTENSION SINGLE LINE TELEPHONE SYSTEM

[75] Inventors: Adriaan D. Overdulve, Springfield; Barry A. Rousseau; Graham S. Laing, both of London, all of Canada

[73] Assignee: Northern Telecom Limited, Montreal, Canada

[21] Appl. No.: 903,930

[22] Filed: May 8, 1978

[51] Int. Cl.² ............................................. H04M 1/00
[52] U.S. Cl. ................................. 179/81 R; 179/99 H
[58] Field of Search ................................. 179/81 R, 99

[56] References Cited

U.S. PATENT DOCUMENTS

| | | | |
|---|---|---|---|
| 3,725,600 | 4/1973 | Hutton | 179/81 R |
| 3,870,831 | 3/1975 | McCarley | 179/81 R |
| 3,997,734 | 12/1976 | Champan | 179/81 R |
| 4,001,520 | 1/1977 | Waldman et al. | 179/81 R |

Primary Examiner—William C. Cooper
Assistant Examiner—Joseph A. Popek
Attorney, Agent, or Firm—Sidney T. Jelly

[57] ABSTRACT

An electronic hold and hold-release circuit for a telephone set in a multiple extension single line telephone system has an indicator in either the tip or ring line, an electronic switch, such as a SCR, across the lines and a manually operated momentary hold button which, when operated after picking up the handset of the telephone, switches the electronic switch device to a conducting state and provides a hold current on the lines, the hold current maintained after replacing the handset. The hold condition is indicated by the indicator. An electronic device in one of the lines prevents current flow when the line voltage drops to about 10 volts, when another telephone handset is picked up, switching the electronic switch to a non-conducting state and releasing the hold. A bridge diode arrangement enables operation on either line polarity. Conveniently the indicator is an LED. Lightning and other voltage surges can be restricted by a resistor.

4 Claims, 1 Drawing Figure

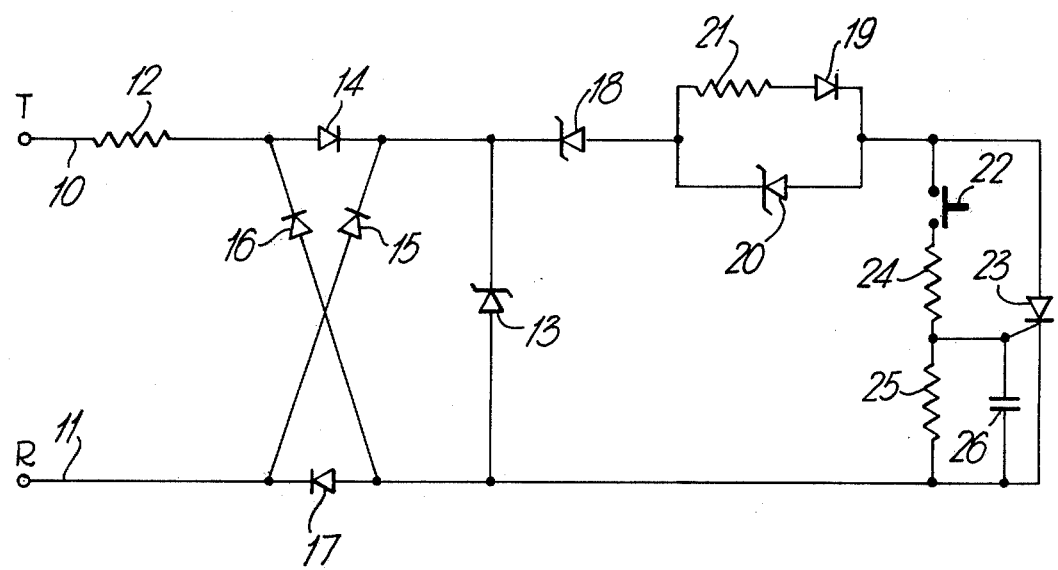

ELECTRONIC HOLD AND HOLD-RELEASE CIRCUIT FOR A TELEPHONE SET IN A MULTIPLE EXTENSION SINGLE LINE TELEPHONE SYSTEM

This invention relates to an electronic hold and hold-release circuit for a telephone set in a multiple extension single line telephone system, such as may be provided to small businesses and domestic premises, such telephone set having a hold button.

In a single line service, with multiple extensions, if a call is answered on one extension and it is desired to transfer the call to another extension, the incoming call can be put to "hold" by pressing the hold button, and then calling the other desired extension. With the present invention, the handset of the original extension can be replaced and the "hold" will be automatically released when the called extension handset is picked up. Each telephone provided with the circuit requires a hold button, and some, or all, of the extensions can be so provided.

The invention provides a switch which is actuated by a momentary pushbutton to provide a "hold" condition as long as no other extension is in use. Means are provided for operation on either line polarity and to provide surge protection. The switch is released by a reduction in line voltage by the picking up of an extension handset. It is small enough to fit in any telephone, and preferably an indicator lamp is provided which indicates a "hold" condition.

The invention will be readily understood by the following description of one particular circuit, as illustrated in the accompanying drawing.

As illustrated in the drawing, tip and ring lines of a telephone line to an establishment are indicated at 10 and 11. A resistance 12 is provided to limit the line holding current and also to drop the voltage when a 1000 volt pulse is applied to the line, and a zener diode 13 is provided to short the 1000 volt pulse, the 1000 volt pulse originating from a lightning surge for example. The diodes 14, 15, 16 and 17 provide a diode bridge to allow operation on either line polarity.

Zener diode 18 is arranged such that, when combined with other voltage drops in the circuit, it ensures that current will not flow in the circuit when the voltage on the telephone line drops to about 10 volts. 10 volts is the expected maximum when a telephone set is off-hook on the line.

In the circuit of the drawing, a lighted indicator is provided, comprising a light emitting diode (LED) 19, with a zener diode 20 to stablize the current through the LED and a resistor 21 to limit the current through the LED.

A momentary switch 22 turns on the SCR 23 to provide hold current on actuation of the switch 22. A resistor 24 is provided to limit the current to the gate of SCR 23 when the switch 22 is momentarially closed and a resistor 25 provides stabilization of the SCR 23. A capacitor 26 prevents the SCR 23 turning on, on the occurrence of spurious pulses.

As a typical example with preselected hold currents of 15 ma with a 1500Ω loop and 40 ma with a zero loop, excluding the 2×200Ω feeding bridge to the line, the following values for the various components provide acceptable operation: resistor 12, 390Ω; zener diode 13, 120 volt 5 watt; diodes 14, 15, 16 and 17 600 volt 1 ampere; zener diode 18 8.2 volt 1 watt; zener diode 20 3.9 volt ½ watt; resistor 21 100Ω ½ watt; resistor 24 180 K ¼ watt; resistor 25 10 K ¼ watt; capacitor 26 0.047 μF/10 volt; and SCR 23 200 volts 1 ampere. These values are of course variable depending upon the desired operating characteristics of the circuit. The circuit operates from telephone line power, is released by a 10 msec. break in power from the central office, will operate on either line polarity, draws a maximum of 5 μA from the line when not actuated, will withstand a 1000 volt lightning surge, is released by any phone going off-hook which is bridged on the same line that the device is holding and is operated by the actuation of a momentary switch.

The operation is as follows. Assuming a call comes in and a person answers the call at one extension. It is desired to transfer the call to another extension. The person answering the call depresses momentarily his hold button—which places the call on hold, switching on the SCR 23, and the indicator 19, replaces his handset then notifies the other extension. On the picking up of the handset at the other extension, the line voltage drops at the original extension and the SCR shuts off, together with the indicator, releasing the hold. By providing the lighted indicator which lights up when the button is depressed, it can be seen whether the other extension answers. If it down and the hold is released, the indicator goes out. If the other extension does not answer the indicator remains lighted. By then picking up the original extension telephone, the SCR 23 switches off. The original extension is then back in contact with the caller with the indicator off and the call can be terminated in a normal manner by replacement of the original extension. Conveniently the indicator can be in hold button. Notifying the other extension can be by various means, such as vocal, independent buzzer or other means.

The circuit is very inexpensive and can be provided with, or fitted into, conventional telephones as long as there is a hold button. It is a simple and inexpensive matter to provide a hold button as it is only a momentary type switch. The invention is applicable for residential use with extensions in different rooms, and for small businesses where a single telephone line is provided but with more than one extension. Instead of a lighted indicator, an audible indicator, for example a buzzer, can be used.

What is claimed is:

1. An electronic hold and hold-release circuit for a telephone set in a multiple extension single line telephone system having a tip line and a ring line, comprising:

an indicator in one of said tip and ring lines;
an electronic switch connected between said tip and ring lines, said switch comprising an SCR;
an actuating circuit connected between said tip and ring lines in parallel to said SCR and including a manual momentary normal open switch and a connection between said actuating circuit and the gate of the SCR, the circuit adapted to switch said SCR to a conductive state on momentary closing of said normally open switch, after picking up the handset of the telephone set, to provide a hold current across said lines while said handset is off-hook, said SCR maintaining said hold current after replacement of said handset, said indicator actuated by said hold current;
an electronic device in one of said lines to prevent flow of current through said lines when the voltage on the lines drops to about 10 volts on picking up a handset in said system thereby switching off said SCR to release said hold; and a bridge diode circuit connected between said lines before said indicator, said SCR and said actuating circuit to permit operation on either line polarity.

2. A circuit as claimed in claim 1, said indicator a visual indicator.

3. A circuit as claimed in claim 1, said indicator a light emitting diode.

4. A circuit as claimed in claim 1, including a resistance in one of said lines to limit line holding current and to drop a voltage pulse applied by a high-voltage surge.

* * * * *